(12) United States Patent
Almasi

(10) Patent No.: US 9,421,613 B2
(45) Date of Patent: Aug. 23, 2016

(54) AIR EJECTOR FOR LATHE

(71) Applicant: Accellent, Inc., Wilmington, MA (US)

(72) Inventor: John Stephen Almasi, Springville, NY (US)

(73) Assignee: Lake Region Medical, Inc., Chaska, MN (US)

( * ) Notice: Subject to any disclaimer, the term of this patent is extended or adjusted under 35 U.S.C. 154(b) by 216 days.

(21) Appl. No.: 14/274,492

(22) Filed: May 9, 2014

(65) Prior Publication Data

US 2015/0321261 A1    Nov. 12, 2015

(51) Int. Cl.
| | | |
|---|---|---|
| *B23B 13/12* | (2006.01) | |
| *B23B 13/02* | (2006.01) | |
| *B23Q 7/00* | (2006.01) | |
| *B65G 51/02* | (2006.01) | |

(52) U.S. Cl.
CPC ............ *B23B 13/12* (2013.01); *B23B 13/02* (2013.01); *B23B 13/128* (2013.01); *B23Q 7/006* (2013.01); *B65G 51/02* (2013.01); *B23B 2270/027* (2013.01); *Y10T 82/2514* (2015.01)

(58) Field of Classification Search
CPC ........ B23B 13/08; B23B 13/12; B23B 13/02; B23B 13/04; Y10T 82/2514; Y10T 82/2521
USPC .................................................. 406/76, 147
See application file for complete search history.

(56) References Cited

U.S. PATENT DOCUMENTS

| | | | | |
|---|---|---|---|---|
| 1,446,305 | A * | 2/1923 | Howe ..................... | B23B 31/30 279/103 |
| 3,340,755 | A * | 9/1967 | Oman .................... | B23B 13/128 82/124 |
| 5,077,876 | A * | 1/1992 | McConkey ........... | B23B 31/207 279/50 |
| 2004/0123732 | A1* | 7/2004 | Lindsay ................ | B23B 31/003 92/93 |
| 2005/0111957 | A1* | 5/2005 | Berns ..................... | B23Q 7/00 414/745.1 |

FOREIGN PATENT DOCUMENTS

EP    1637259 A1 *   3/2006    ............ B23B 31/003

* cited by examiner

*Primary Examiner* — Sunil K Singh
*Assistant Examiner* — Ryan Rufo
(74) *Attorney, Agent, or Firm* — Ganz Pollard, LLC

(57) ABSTRACT

A part ejector is shown and described wherein a machined part in a CNC lathe is ejected from a spindle of the lathe by means of an air pressure differential. The part ejector includes inner and outer tubes that are coupled to, and aligned with a spindle collet. Machined parts are received within the inner tube and a pin tool moves a pin into the inner tube to pneumatically seal the inner tube and push a machined part past one or more air ports that pneumatically connect the inner tube with an air channel located between the inner and outer tubes. Pressurized air is applied to the air channel and the pin is partially retracted to uncover the air ports thus allowing the pressurized air to enter the inner tube and eject the machined part out.

16 Claims, 6 Drawing Sheets

AIR EJECTOR FOR LATHE

BACKGROUND

The inventive subject matter relates to part ejector mechanisms on lathe machines and in particular part ejector mechanisms on CNC metal lathe machines.

Metal lathes machine metal bar stock. Older metal lathes required manual loading of the bar stock into a headstock having a spindle and collet that securely held and rotated the stock while machine tools would machine the part. A tailstock could also hold and rotate the bar stock. Sometimes longer work pieces would be held by the headstock and the tailstock. The tailstock may hold the bar stock while a finished or partially finished work piece is cut from bar stock. Additionally the tailstock could hold the work piece to allow secondary machining on the work piece from angles that may not be possible when the work piece is held by the headstock.

Many type of machine tools are employed to work the bar stock such as cutters and drills that are mounted on tool holders that are in turn mounted on a bed of the lathe. These older lathes were manually operated and thus were not enclosed because an enclosure would interfere with operator access to the work piece.

CNC (computer numerical controlled) lathes improve on the older lathes by providing significantly greater precision and repeatability. CNC lathes may be programmed manually, or directly from CAD/CAM files. In CNC lathes a main spindle holds the bar stock and machine tools are mounted onto a turret or tool block. The tool block moves along slides so that individual tools may by indexed into position to work on the work piece. Typically, tool blocks may move in multiple directions to control the orientation of the tool to the work piece, that is, for example, the angle, height, and depth of a cut may be controlled simultaneously. When work on the work piece reaches a predetermined point in the process, a sub-spindle engages the work piece and the piece is cut from the bar stock. Further work may then be performed on the work piece while the sub-spindle holds it.

CNC lathes are typically enclosed for safety reasons. Also, CNC lathes may be automated to repeat a process to produce multiple work pieces in succession. These automatic machine processes require a means to eject the work piece from the sub-spindle when work is completed.

Swiss-style CNC lathes further improve on the CNC lathe by employing a guide bushing in front of the main spindle collet. The bar stock extends through the guide bushing, which steadies the bar stock/work piece and the machine tools are deployed to work on the work piece near the guide bushing. The main spindle moves along the axis of rotation (referred to as the Z-axis) and the work piece extends further or lesser through the guide bushing as necessary to position the portion of the work piece currently undergoing machining. This arrangement steadies the work piece and because all the tools work on the work piece near a point of support, greater precision is achieved.

At a predetermined point in the process, the bar stock is moved further through the guide bushing and the work piece is engaged by the sub-spindle and cut from the bar stock. Further machining may occur as the sub-spindle holds the work piece. When all work is complete, the work piece must be ejected so the process may be repeated.

In Swiss-style lathes, the distance from the guide bushing to the sub-spindle is limited thus impeding the ability to design a path for automatically removing finished work pieces that are relatively long. In these cases, the work piece may be ejected out the "back" of the machine, that is, ejected rearwardly out of the sub-spindle in a direction away from the main spindle.

Prior art parts ejectors employ mechanical ejectors where a work piece is pushed out of the sub-spindle by a rod or cable and longer work pieces again poses a problem because it is impractical to employ a push rod long enough to push a long work piece all the way out. As a consequence, prior art ejectors would partially push a work piece out and then load a spacer, or chub, and then load the next work piece. After the subsequent work piece was completed, it would be partially ejected by the mechanical ejector and as it was partially pushed out it would "eject" the prior work piece.

SUMMARY

These and other embodiments are described in more detail in the following detailed descriptions and the figures.

The following is a description of various inventive lines under the inventive subject matter. The appended claims, as originally filed in this document, or as subsequently amended, are hereby incorporated into this summary section as if written directly in.

The inventive subject matter is directed to a part ejector for rearward ejecting machined parts from a sub-spindle of a CNC lathe. The part ejector includes a first tube and a second tube arranged coaxially wherein a part channel is defined through the first tube and an air channel is located between the first tube and the second tube and the air channel is substantially pneumatically sealed from the ambient environment, wherein an air port is located in a wall of the first tube and the air port pneumatically connects the part channel with the air channel. A plug is sized to fit within the part channel and has a cross section sized to at least partially pneumatically block one end of the part channel and having a length sufficient to extend past the air port when the plug is sufficiently inserted into the part channel. When a machined part is ready to be ejected, the plug is inserted into a forward end of the part channel to a first position moving the machined part along the part channel past the air port and then retracting the plug to a second position at least partially pneumatically blocks the forward end of the part channel and at least partially does not cover the air port whereby pressurized air provided to the air channel passes through the air port into the part channel thereby moving the machined part located therein and ejecting it from the tube.

The foregoing is not intended to be an exhaustive list of embodiments and features of the inventive subject matter. Persons skilled in the art are capable of appreciating other embodiments and features from the following detailed description in conjunction with the drawings.

BRIEF DESCRIPTION OF THE DRAWINGS

The appended figures show embodiments according to the inventive subject matter, unless noted as showing prior art.

DETAILED DESCRIPTION

Figure 1:
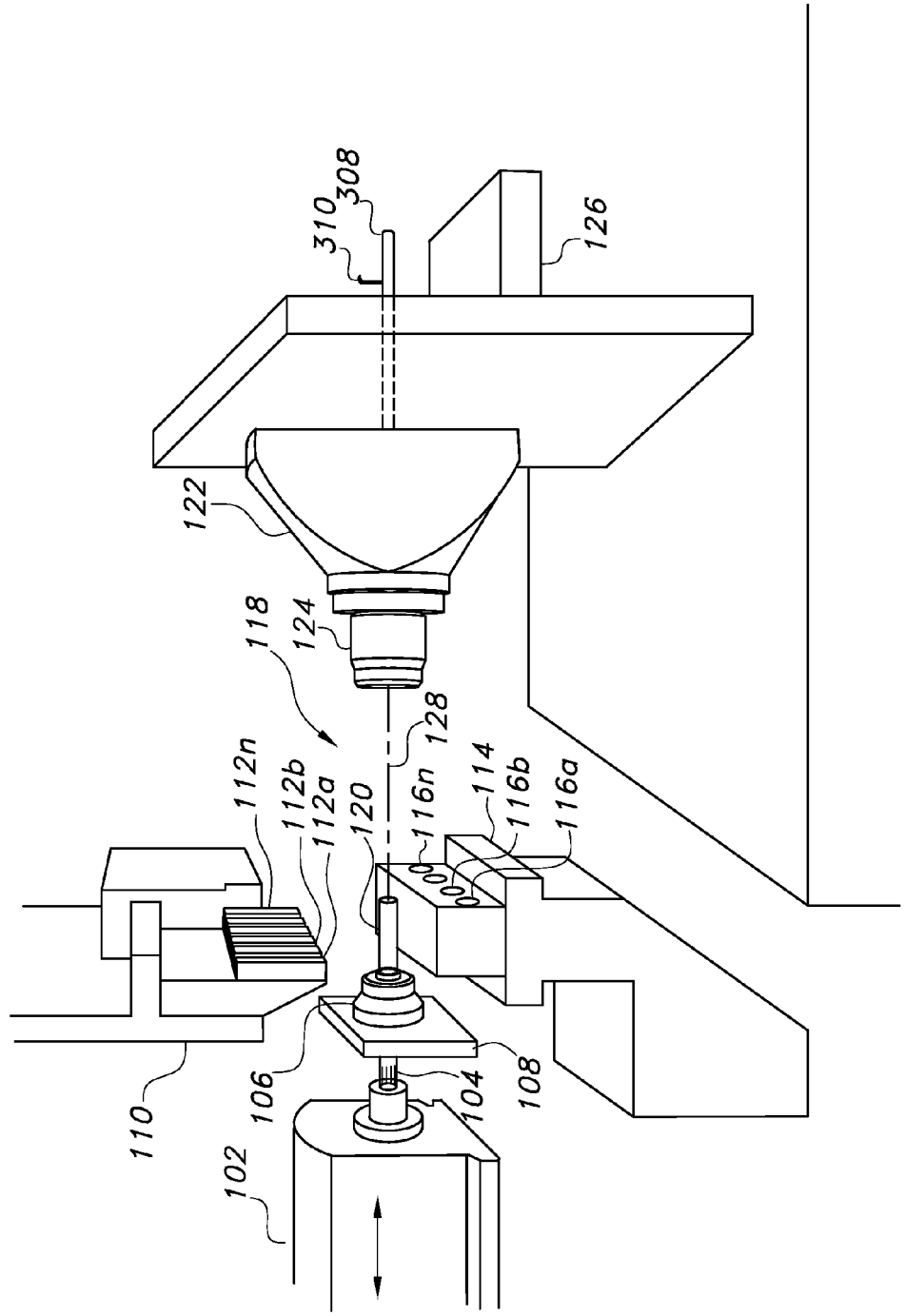
FIG. 1 shows a diagrammatic representation of relevant parts of a Swiss-style lathe.

Representative embodiments according to the inventive subject matter are shown in FIGS. 1-5, wherein the same or generally similar features share common reference numerals.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

As used herein, "and/or" means "and" or "or", as well as "and" and "or." Moreover, any and all patent and non-patent literature cited herein is hereby incorporated by references in its entirety for all purposes.

FIG. 1 shows a diagrammatic representation of a Swiss-style CNC lathe. In practice, the parts and elements represented in this figure are mounted to a lathe bed, surrounded by an enclosure or housing and a control panel is coupled to the lathe housing to control the lathe operation. The general operation of CNC lathes is well known and well documented in the known art.

A main spindle 102 receives and securely holds a length of bar stock 104. Typical means for securing the bar stock to the main spindle is by a collet that tightens about the stock. The bar stock protrudes through a guide bushing 106 that supports the bar stock and allows the bar stock to rotate within the bushing and to extend and retract through the bushing. The bushing is mounted to a bulkhead 108 that is fixed to a bed or frame of the lathe. In this diagrammatic view, the bulkhead is shown as a partial element.

Figure 4A:
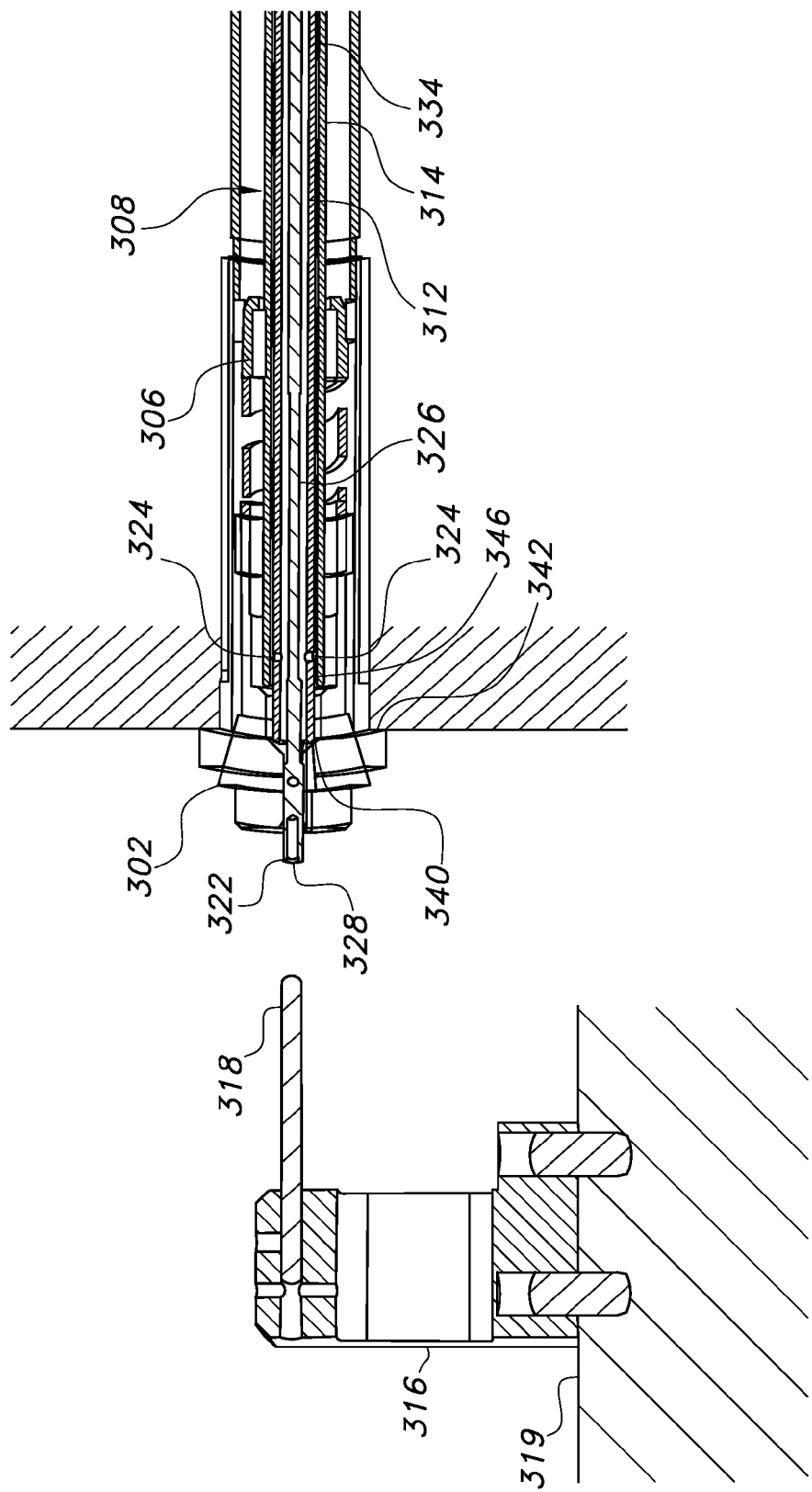
FIGS. 4a, 4b, and 4c show an enlarged view of the forward, or collet end, of a work piece ejector in accordance with an embodiment of the invention.

The portion of the bar stock 104 protruding through the bushing into work space 118 shall be referred to as work piece 120. The work piece is the portion of the bar stock that is machined to become the desired machined part. A representational machined part is shown in FIGS. 4 and 5 at 322. For purposes of the inventive subject matter, the configuration of the machined part is irrelevant—the invention may be used with multiple configurations, sizes, and types of machined parts.

FIG. 1 further shows a first turret 110 that depends from an upper part of the lathe frame (not shown) and supports a plurality of machine tools 112a-112n. A second turret 114 supports a plurality of machine tools 116a-116n. The turrets move within slides and are capable of translation and rotation to allow flexibility in orienting a machine tool with respect to the work piece 120.

A sub-spindle 122 includes a collet 124 that is mounted inline with the main spindle 102.

Completed machined parts must be ejected from the sub-spindle. Usual configurations eject the machine part toward a front end of the sub-spindle collet, that is into the work space 118 that is between the sub-spindle and the main spindle. Some configurations eject the machined part rearwardly, that is away from work space. FIG. 1 shows a parts tray 126 at the back end of sub-spindle to receive rearwardly ejected parts.

In a typical lathe process, bar stock 104 is loaded into the main spindle and secured by the collet. The main spindle can move along an axis of rotation or Z-axis 128; the main spindle can also extend and retract the bar stock in the direction of the Z-axis through the bushing into the work space 118 where the machine tools mounted on the first and second turrets 110, 114 can be moved into contact with the bar stock/work piece 120. In Swiss-style lathes all machining is performed close to the bushing so the bar stock/work piece in inhibited from flexing thus providing greater precision in the machine operations. To machine along the length of the work piece the bar stock is further extended through the bushing 106.

When a desired amount of machining has been performed on the work piece, the bar stock is further extended through the bushing and the sub-spindle moves to engage the work piece and secure it. A cutting tool then cuts the work piece from the bar stock as the spindles and bar stock rotate.

With the work piece 120 now free of the main spindle and secured only to the sub-spindle, further machining may be performed. When all machining is completed, the machined part 322 (FIG. 4a) must be ejected from the sub-spindle. CNC controlled lathes permit automated processes and repeated operations. Thus, once programmed and set up, a CNC lathe may automatically make part after part without human intervention. Accordingly, a means is necessary for the automatic ejection of the finished machined part.

Figure 2:
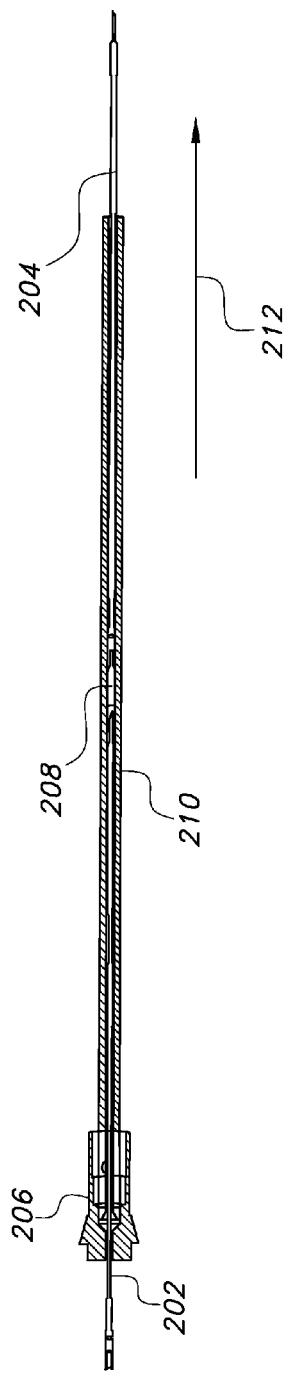
FIG. 2 shows a prior art ejector mechanism.

FIG. 2 shows a prior art mechanical ejector for rearward ejection wherein a first machined part 202 pushes against a prior machined part 204 to rearwardly eject it from the sub-spindle collet 206. A chub 208 is placed between work pieces 202 and 204 to prevent damage of one work piece by the other. The work pieces and chub ride in tail tube 210 and eject the machined parts in the direction of arrow 212. As noted, this is a rearward ejection from the sub-spindle. This direction of ejection is preferable, and may be necessary, when the machined part is long relative to the work space 118 because ejecting long parts into the work space may result in the part hanging up on a turret or frame element and not falling through to a collecting tray. And, obviously, if the machined part is longer than the maximum distance between the guide bushing and the sub-spindle then the only viable means of ejecting the machined part is by rearward ejection.

The prior art rearward ejectors, such as shown in FIG. 2, further relied on a special tool to insert the chub 208 between parts, and actuator cables and rods (not shown) to push against the part that would push the prior part through the tail tube 210.

Figure 3:
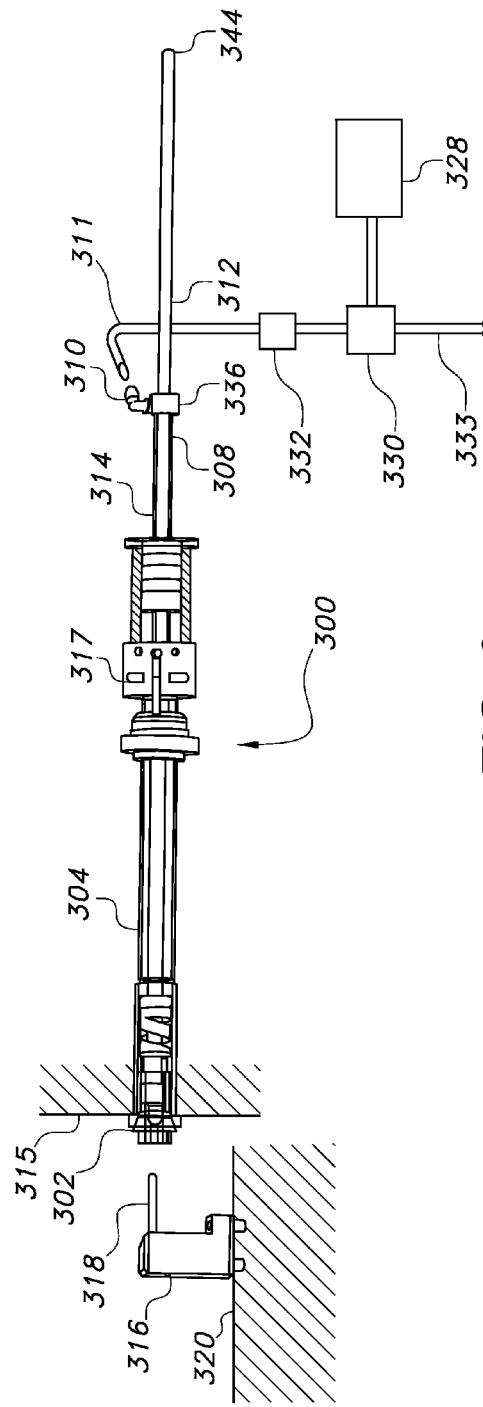
FIG. 3 shows a work piece ejector in accordance with an embodiment of the invention.

FIG. 3 shows an embodiment of the inventive aspects of air ejector assembly 300 coupled to a cut-away view of sub-spindle collet 302 and housing assembly 304. The air ejector assembly 300 comprises a bushing 306 (ref. FIG. 4A) supporting tube assembly 308 and air inlet 310. The tube assembly 308 comprises inner tube 312 protruding from outer tube 314, and seals shown and described below. In use, the ejector assembly 300 would be coupled to a sub-spindle such as sub-spindle 122 in FIG. 1 shown diagrammatically here as 315. Also shown are sub-spindle elements 317, not relevant to the invention described and claimed herein.

Also shown in FIG. 3 is pin tool 316 having pin 318. In use, the pin tool 316 would be mounted on a tool turret, such as the second turret 114 in FIG. 1. In this FIG. 3, the pin tool is shown diagrammatically coupled to turret 320.

Air is provided to the air inlet 310 via line 311 by air supply 328 through solenoid valve 330 and regulator 332. A control signal is provided at 333 to control operation of the solenoid valve.

Figure 4B:
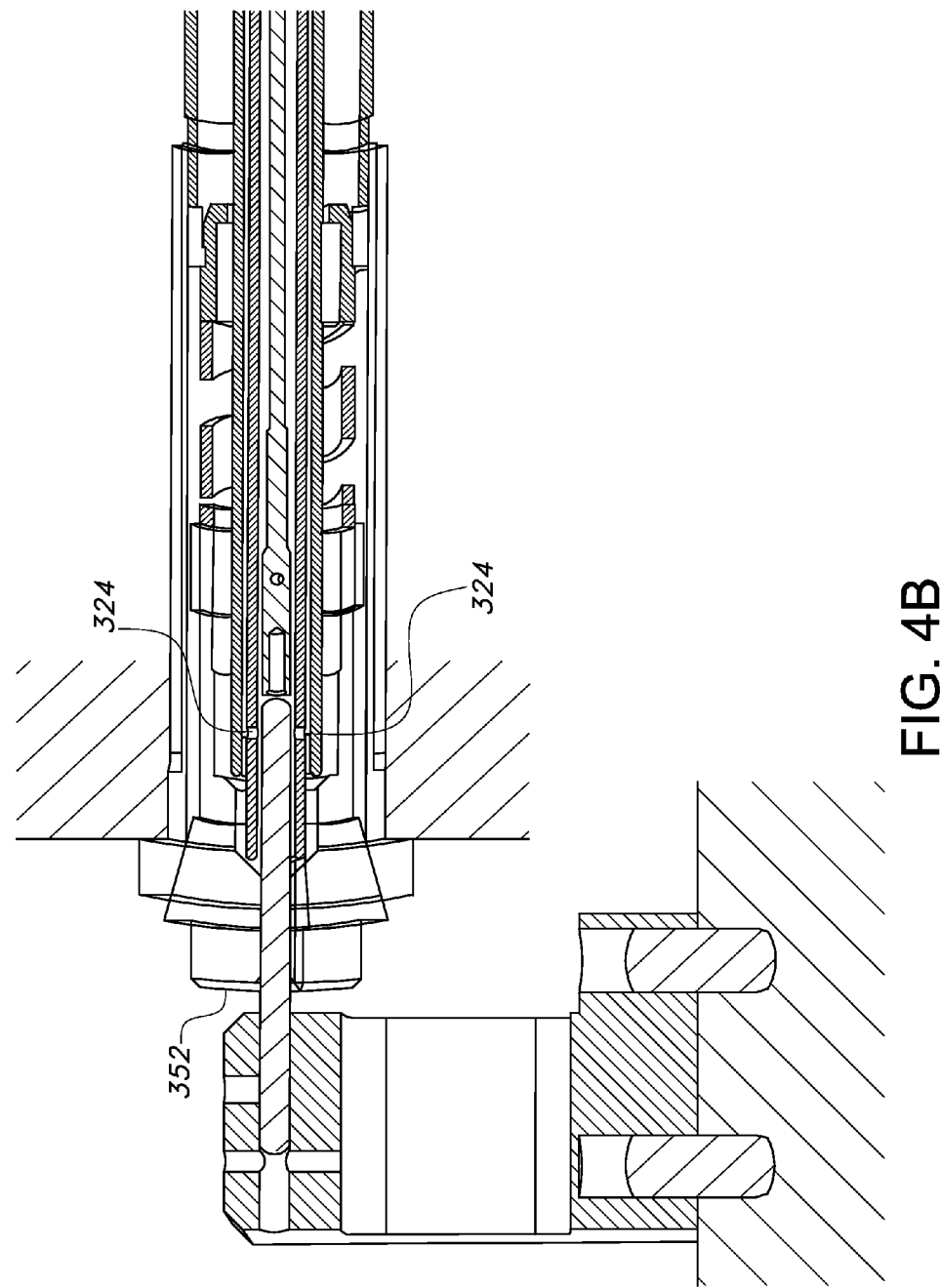
Figure 5:
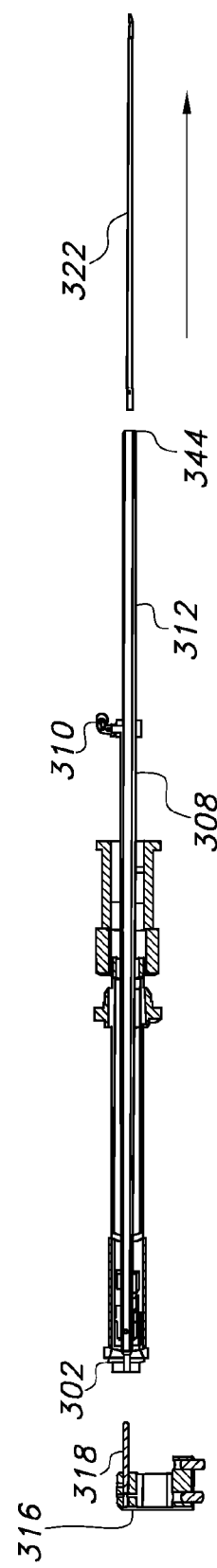
FIG. 5 shows a work piece ejected from a work piece ejector in accordance with an embodiment of the invention.

FIGS. 4a-4b show a sequence of steps for air ejecting a lathe-machined part from the air ejector assembly 300. In overview the steps comprise moving the pin tool 316 into position so that pin 318 is aligned with a machined part 322 that is held by collet 302; releasing the collet grip on the part 322 and inserting the pin 318 into a cylindrical part channel 326 past air ports 324; providing air pressure into a space between the inner and outer tubes via air inlet 310; partially withdrawing the pin 318 so air ports 324 are unimpeded by the pin to allow air to flow through the air ports into the part channel 326; the pin meanwhile blocking the end of the part channel so that air pressure in the part channel pushes the part 322 along the part channel rearwardly away from the collet. The part is pushed through the part channel and out of the inner tube 312 onto a part tray, such as tray 126 shown in FIG. 1. Thereafter, the pin tool 316 is withdrawn and moved away so another part may be machined on the lathe. The steps and elements are described in greater detail below.

FIG. 4a shows machined part 322 residing in part channel 326 and partially protruding from sub-spindle collet 302. This representative part 322 is long and thin and extends outside the figure, which is enlarged to show details not otherwise discernable. The part channel 326 is a cylindrical channel defined within the inner tube 312 of the air ejector tube assembly 308. In alternative embodiments the part channel 326 may have a cross section that is not circular, such as rectangular or square with or without rounded corners.

Tube assembly 308 comprises the outer tube 314 and the inner tube 312 where the inner tube resides within the outer tube and may be positioned coaxially within the outer tube. A thin, annular channel 334 separates these tubes. The inner tube 312 has a first, or forward, end 340 located near a shoulder 342 of the collet 302 and a second, or terminus, end 344 that defines the point at which machined parts 322 are rearwardly ejected.

The inner tube further includes the air ports 324 that are located proximate the first end and slightly downstream toward the second end by a predetermined distance that is further explained below. The air ports extend from the part channel through the wall of the inner tube 312 to the annular channel 334 and thus pneumatically connects the part channel with the annular channel. The illustrated embodiment provides two air ports but other embodiments may have a fewer or greater number of ports.

A first seal 346, located proximate the first end 340, extends circumferentially around the inner tube 312 and within the outer tube 314 and seals the annular channel 334 near the first end 340. A second seal is formed by air inlet flange 336 that seals the other end of the annular channel near the air inlet 310. Accordingly, air that is pumped through the air inlet 310 enters the annular channel 334 and is contained in the annular channel by the first seal 346 and the flange 336 and directed to the air ports 324. When the pin 318 covers the air ports, air flow from the annular channel into the part channel may be impeded somewhat and when the pin does not cover the air ports air can flow unimpeded from the annular channel through the air ports into the part channel 326.

Referring to FIG. 4a, the part 322 is ready to be ejected from the sub-spindle collet. The pin tool 316, mounted on a tool turret, has been moved into position so that the pin 318 is aligned with the part channel 326 and the part to be ejected.

In FIG. 4b, the pin tool and pin are moved toward the sub-spindle so that the pin 318 enters the part channel 326 and mechanically moves the part 322 downstream past the air ports 324. Thus, the location of the air ports 324 and the length of the pin 318 is such that the pin moves the part 322 when the pin tool 316 is sufficiently close to the collet 302. Accordingly, the distance from an outside surface 352 of the collet to the air ports 324 is less than the length of the pin 318.

Also, the diameter of the pin 318 is such that the pin can substantially pneumatically seal the part channel 326 when it is inserted therein.

Figure 4C:
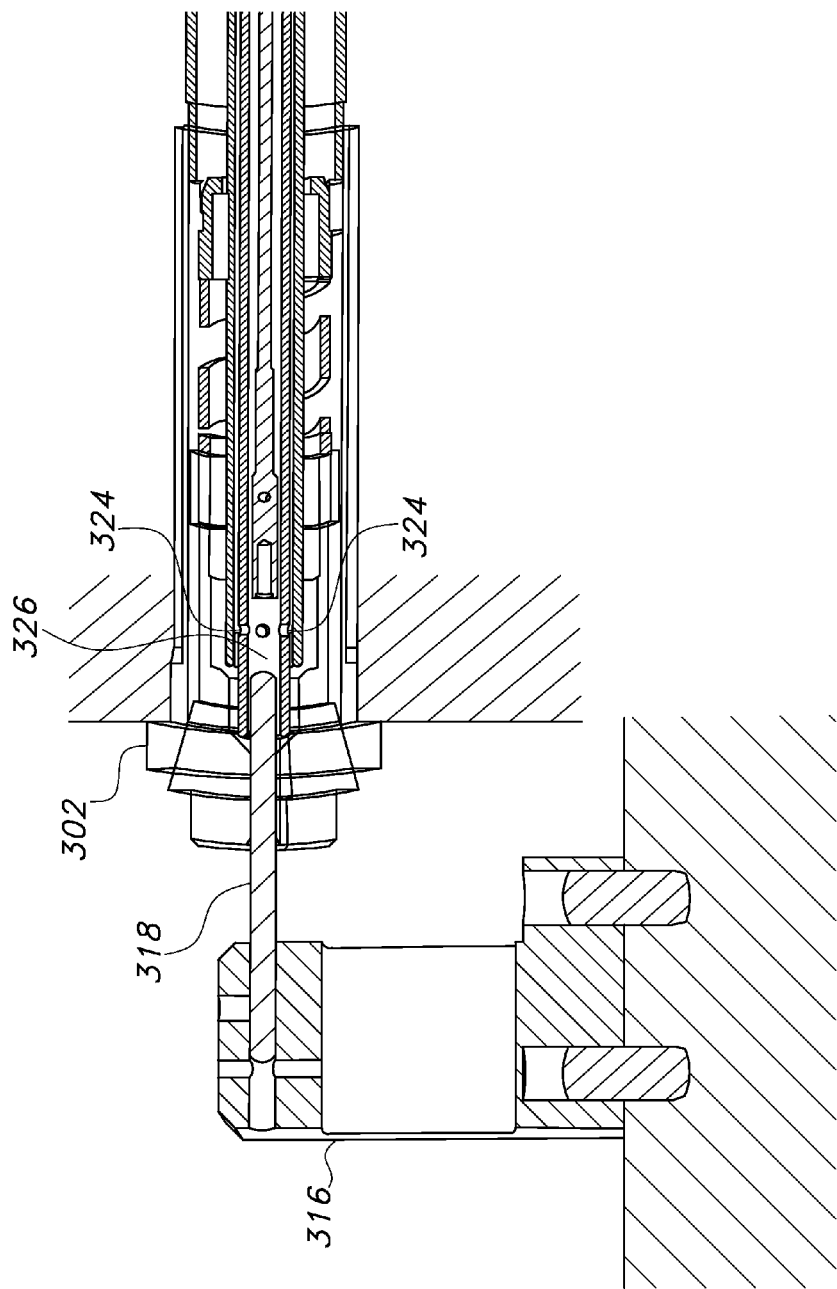

In FIG. 4c the pin tool 316 has partially retreated so that pin 318 uncovers the air ports 324 and pressurized air in the annular channel 334 passes through the air ports 324 into the part channel 326. Pin 318 now blocks the end of the part channel 326 preventing pressurized air from exiting through from the part channel at the first end 340. The pressurized air thus forces the machined part 322 downstream in the part channel and out the second end 344 of the inner tube thus ejecting the part rearwardly from the sub-spindle as shown in FIG. 5. It is not necessary that the pin pneumatically seal the part channel, simply that it impede air flow sufficiently so that pressurized air flowing into the part channel can pneumatically eject part 322 as described.

The air ejector shown and describe may eject various types and sizes of machined parts and be incorporated with various processing or machining steps. Machined parts that are long relative to the work space 118 are preferably ejected reward from the sub-spindle and rearward ejection lends itself to the inventive line however the invention shown and described may also accommodate ejection into the work space. FIGS. 1 to 5 show an embodiment wherein the machines parts are ejected rewardly.

The invention is described as an air ejector and air is used in the description of the process and elements. However, any gas that may be pressurized can be suitable to effect the invention described herein. The pressure differential and volume of gas needed to eject a part depends upon the size, weight, and configuration of the machined part. A pressure differential between the pressure in the part channel and the pressure in the ambient environment sufficient to move the machined part is necessary to move the part. The rate at which the part channel is exposed to the pressure differential may assist with overcoming static friction of the part in the part channel.

The inner tube and the outer tube are shown and described as annular and cylindrical in shape. However, other shapes may be suitable and in particular the inner tube may have a cross-section to accommodate a particular machined part. It is desirable to have the machined part fit within the part channel, defined by the inner space of the inner tube, in a manner to permit its free motion along the part channel and to sufficiently impede a flow of air within the part channel when there is an air pressure differential at the opposite ends of the machined part.

The previous description of embodiments is provided to enable any person skilled in the art to make or use the disclosed innovations. Various modifications to those embodiments will be readily apparent to those skilled in the art from the teachings herein, and the generic principles defined herein may be applied to other embodiments without departing from the spirit or scope of this disclosure. Thus, the claimed 5 inventions are not intended to be limited to the embodiments shown herein, but are to be accorded the full scope consistent with the language of the claims. In the claims reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the 15 claims. No claim element is to be construed as "a means plus function" claim under US patent law, unless the element is expressly recited using the phrase "means for" or "step for".

The inventor reserves all rights to the subject matter disclosed herein, including the right to claim all that comes within the scope and spirit of the following claims:

What is claimed is:

1. A part ejector for rearward ejecting machined parts from a sub-spindle of a CNC lathe, the ejector comprising:

a) a first tube and a second tube arranged coaxially wherein a part channel is defined through the first tube and an air channel is located between the first tube and the second tube and the air channel is substantially pneumatically sealed from the ambient environment;
b) wherein an air port is located in a wall of the first tube and the air port pneumatically connects the part channel with the air channel;
c) a tool having a plug sized to fit within the part channel and substantially pneumatically block one end of the part channel; and
d) whereby the plug inserted within the part channel to a first position covers the air port and an end of the part channel and the plug inserted within the part channel to a second position substantially pneumatically blocks the end of the part channel and at least partially does not cover the air port whereby air provided to the air channel passes through the air port into the part channel thereby moving a machined part located therein.

2. The part ejector of claim 1 further comprising an air inlet pneumatically connected to the air channel whereby pressurized gas may be provided to the air channel through the air inlet.

3. The part ejector of claim 2 further comprising a valve and a regulator to control the flow of gas to the air inlet.

4. The part ejector of claim 1 wherein the first tube is sized so that the part channel accepts the machined part and the machined part at least partially pneumatically blocks the part channel.

5. The part ejector of claim 1 wherein the first tube extends rearwardly past the outer tube.

6. The part ejector of claim 1 comprising plural air ports in the wall of the first tube.

7. The part ejector of claim 1 wherein the plug is a cylindrical pin having a diameter sufficient to substantially pneumatically block the part channel and a length sufficient to extend over the air port when the pin in inserted into the part channel.

8. The part ejector of claim 7 wherein the pin moves the machined part past the air port when the pin is in the first position so that the machined part does not cover the air port.

9. A part ejector for a CNC lathe machine, comprising:
a) a first tube having an inner cross-sectional dimension and an outer cross-sectional dimension wherein a part channel is defined within the first tube;
b) a second tube having an inner cross-sectional dimension that is larger than the outer cross-sectional dimension of the first tube;
c) wherein the first tube is located at least partially within the second tube and a space between the first tube and the second tube defines an air channel that is substantially pneumatically sealed from the ambient environment;
d) an air port located in a wall of the first tube that pneumatically connects the part channel and the air channel;
e) a plug sized to at least partially pneumatically seal a forward end of the part channel and to extend from the forward end past the air port; and
f) a first position of the plug whereby the plug at extended into the forward end of the part channel and past the air port and a second position whereby the plug is partially retracted to at least partially uncover the air port and at least partially pneumatically seal the part channel proximate the forward end whereby gas can flow through the air port when there is a pressure inequality between gas in the part channel and the air channel and the gas is urged toward a rearward end of the first tube.

10. The ejector of claim 9 further comprising an air inlet pneumatically connected to the air channel.

11. The ejector of claim 9 wherein the plug is a cylindrical pin and the part channel is a cylindrical channel and the pin has a diameter sufficient to at least partially pneumatically seal the part channel and a length sufficient to extend over the air port when the pin is sufficiently inserted into the part channel.

12. The ejector of claim 9 wherein the inner cross-sectional dimension of the first tube is large enough to accept a machined part and small enough so that the machined part at least partially pneumatically blocks gas flow through the part channel when the part is in the part channel and there is a gas pressure differential at ends of the machined part.

13. The ejector of claim 9 further comprising a pin tool supporting the plug.

14. The ejector of claim 9 wherein the first tube is cylindrical and the second tube is cylindrical and the tubes are coaxial.

15. The ejector of claim 9 wherein the first tube has a non-annular cross-section.

16. The ejector of claim 9 further comprising a sub-spindle and a control computer and wherein the ejector is coupled to the sub-spindle and the control computer directs movement of the plug and application of pressurized gas to eject a machined part at a desired time.

* * * * *